UNITED STATES PATENT OFFICE.

PERCY S. ANNEKE, OF DULUTH, MINNESOTA, ASSIGNOR TO CELITE PRODUCTS COMPANY, OF LOS ANGELES, CALIFORNIA, A CORPORATION OF CALIFORNIA.

PLASTER COMPOSITION.

1,264,747.

Specification of Letters Patent. Patented Apr. 30, 1918.

No Drawing. Application filed August 21, 1916. Serial No. 115,935.

*To all whom it may concern:*

Be it known that I, PERCY S. ANNEKE, a citizen of the United States, residing at Duluth, in the county of St. Louis and State of Minnesota, have invented a new and useful Plaster Composition, of which the following is a specification.

This invention relates to a plaster composition adapted for use particularly in making mortar or plaster for covering walls or for similar purposes. It may also be used for any purpose for which lime is adapted.

The main object of the present invention is to provide a composition having hydrated lime as its base but having properties of plasticity, lightness and economy in use that are of especial advantage in such a composition.

My improved plaster composition consists essentially of hydrated lime together with a non crystalline silica having colloidal properties, preferably kieselguhr, both being finely divided and brought to a state of intimate mixture by intergrinding.

The hydrated lime is made by hydrating quicklime in any usual or suitable manner, preferably so that the lime is not completely saturated with water, and so as to leave the hydrated lime as a comparatively dry mass. This is interground with the proper proportion of kieselguhr, according to the use to which the plaster is to be put. In case a comparatively hard plaster or mortar is to be made from the composition, or the composition is to be used with a considerable proportion of sand or other filler, it is desirable to use say about five per cent. of kieselguhr by weight, in the mixture. In case a comparatively soft plaster or mortar is to be made from the composition, or in case the composition is to be used without any considerable admixture of sand or other filler, as much as fifteen or twenty per cent. by weight of kieselguhr may be used in the total mixture.

The mixture of hydrated lime and kieselguhr is interground in any suitable mill to a fineness of say 200 mesh, and is then ready for use on mixing with water, any desired filler, coloring matter or other additional material being added if desired. As the mixture forms a dry powder, it may be packed in suitable containers, such as sacks, or barrels, for storage or shipment, or may be stored and shipped in bulk, in the same manner as ordinary hydrated lime.

Instead of kieselguhr (diatomaceous or infusorial earth) I may use other forms of non-crystalline silica, for example, tufa, volcanic ash, etc. I prefer however, to use kieselguhr on account of its extreme porosity and lightness.

What I claim is:

1. A plaster composition consisting of hydrated lime and non-crystalline silica, interground to form an intimate mixture.

2. A plaster composition consisting of hydrated lime and kieselguhr, interground to form an intimate mixture.

3. A plaster composition consisting of lime hydrated so as to leave it dry, and kieselguhr, both interground to form an intimate mixture.

4. A plaster composition consisting of dry hydrated lime and noncrystalline silica interground to form an intimate mixture.

5. A plaster composition consisting of dry hydrated lime and kieselguhr, in proportions substantially as specified, and interground with hydrated lime to form an intimate mixture.

In testimony whereof I have hereunto set my hand, at Duluth, Minn., this 7th day of August, 1916.

PERCY S. ANNEKE.

Witnesses:
S. I. DUCLETT,
C. A. KNUTSON.